US012656650B2

(12) United States Patent
Jacques et al.

(10) Patent No.: US 12,656,650 B2
(45) Date of Patent: Jun. 16, 2026

(54) FUNCTIONAL ELEMENT WITH ELECTRICALLY CONTROLLABLE OPTICAL PROPERTIES

(71) Applicant: SAINT-GOBAIN GLASS FRANCE, Courbevoie (FR)

(72) Inventors: Florence Jacques, Herzogenrath (DE); Li-Ya Yeh, Herzogenrath (DE); Michael Labrot, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 302 days.

(21) Appl. No.: 18/695,612

(22) PCT Filed: Sep. 7, 2022

(86) PCT No.: PCT/EP2022/074884
§ 371 (c)(1),
(2) Date: Mar. 26, 2024

(87) PCT Pub. No.: WO2023/046482
PCT Pub. Date: Mar. 30, 2023

(65) Prior Publication Data
US 2026/0140418 A1     May 21, 2026

(30) Foreign Application Priority Data
Sep. 27, 2021     (EP) ..................................... 21199155

(51) Int. Cl.
*G02F 1/155*         (2006.01)
(52) U.S. Cl.
CPC .................................... *G02F 1/155* (2013.01)
(58) Field of Classification Search
CPC .......... G02F 1/155; G02F 1/1323; E06B 9/24; E06B 2009/2464
See application file for complete search history.

(56) References Cited

U.S. PATENT DOCUMENTS

2004/0227462 A1    11/2004  Utsumi et al.
2012/0026573 A1     2/2012  Collins et al.
(Continued)

FOREIGN PATENT DOCUMENTS

DE      10 2008 026339 A1    12/2009
DE      20 2008 017611 U1     4/2010
(Continued)

OTHER PUBLICATIONS

International Search Report as issued in International Patent Application No. PCT/EP2022/074884, dated Dec. 14, 2022.

*Primary Examiner* — Mariam Qureshi
(74) *Attorney, Agent, or Firm* — CUSHMAN PARTNERS, LLC

(57)         ABSTRACT

A functional element having electrically controllable optical properties with side edges includes first and second carrier films having first and second flat electrodes and an active layer arranged flat between the first and second flat electrodes. A first and a second bus bar are arranged on at least one first side edge, the first and second carrier films have first and second recesses. The first bus bar is arranged on the surface of the second carrier film facing away from the second flat electrode and in the region of the second recess passes through the latter and contacts the first flat electrode electrically conductively. The second bus bar is arranged on the surface of the first carrier film facing away from the first flat electrode and in the region of at least one first recess passes through the latter and contacts the second flat electrode electrically conductively.

16 Claims, 5 Drawing Sheets

(56)　　　　　References Cited

U.S. PATENT DOCUMENTS

Figure 1A:
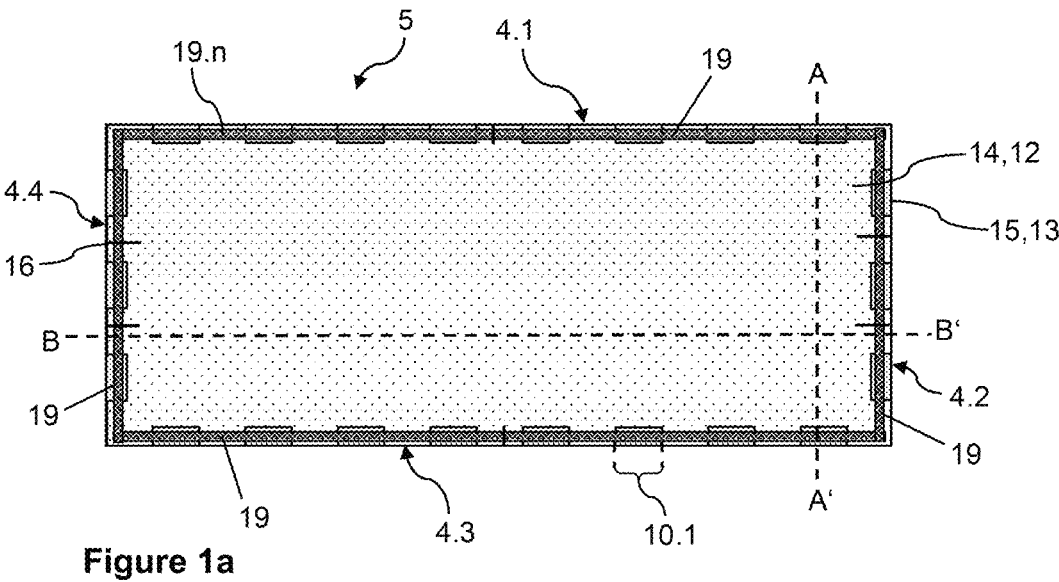

| | | | |
|---|---|---|---|
| 2016/0377948 A1* | 12/2016 | Rozbicki ............... | G02F 1/1533 |
| | | | 359/275 |
| 2018/0011383 A1* | 1/2018 | Higashihara ...... | B32B 17/10513 |
| 2024/0278542 A1* | 8/2024 | Pohlen .............. | B32B 17/10201 |

FOREIGN PATENT DOCUMENTS

| | | |
|---|---|---|
| EP | 0 876 608 B1 | 4/2002 |
| EP | 0 847 965 B1 | 10/2004 |
| EP | 1 840 449 A1 | 10/2007 |
| EP | 1 862 849 A1 | 12/2007 |
| EP | 2 416 385 A1 | 2/2012 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2012/052315 A1 | 4/2012 |
| WO | WO 2020/083562 A1 | 4/2020 |
| WO | WO 2020/083563 A1 | 4/2020 |

\* cited by examiner

A-A'

B-B'

FUNCTIONAL ELEMENT WITH ELECTRICALLY CONTROLLABLE OPTICAL PROPERTIES

CROSS-REFERENCE TO RELATED APPLICATIONS

This application is the U.S. National Stage of PCT/EP2022/074884, filed Sep. 7, 2022, which in turn claims priority to European patent application number 21 199 155.9 filed Sep. 27, 2021. The content of these applications are incorporated herein by reference in their entirety.

The invention relates to a functional element having electrically controllable optical properties, a method for step-like switching of the functional element, and a composite pane comprising such a functional element.

For glare protection of the driver or further occupants, conventional motor vehicles have mechanical sun shades. These are mounted on the vehicle roof in a hinged or displaceable manner and can be folded down or pulled down if necessary in order to prevent or at least reduce the glare for the driver or passenger.

Windshields and roof panels are also known into which a sun shade in the form of a functional element with electrically controllable optical properties is integrated, in particular with electrically controllable transmission or scattering behavior. The driver can thus control the transmission behavior of the glazing itself with respect to solar radiation, and conventional mechanical sun shades can be dispensed with. The weight of the vehicle can thus be reduced and space is obtained in the roof region. In addition, the electrical control of the sun shade is more comfortable for the driver. In particular in the case of large-area panoramic glass panes in the roof region, there is also a need to variably control the transmission of the pane. Depending on the position of the sun, there is a need here for only partial regions of the pane to be masked out, or also to switch the complete surface to be non-transparent for privacy in the parked vehicle.

Possible electrically switchable functional elements for realizing controllable sun shades are electrochromic functional elements, PDLC functional elements (polymer-dispersed liquid crystal), SPD functional elements (suspended-particle devices) and electroluminescent functional elements. The operating principle of such functional elements is known to a person skilled in art. The functional elements mentioned generally comprise two carrier films, on each of which a flat electrode is arranged, wherein an active layer is introduced between the carrier films directly adjacent to the flat electrodes. Depending on the electrical voltage applied to the flat electrodes, the optical properties of active layer change. In order to achieve a gradual or partial change in the optical properties, a voltage that is different locally or in sections is applied to the flat electrodes; the electrical contacting can therefore be adjusted accordingly.

The electrical contacting of electrically controllable functional elements is usually effected via conductor bars (also referred to as "bus bars"), which are applied to the flat electrodes in the edge region of the functional element and contact them electrically conductively. By connecting the bus bars to an external voltage source, for example via flat conductors attached to the bus bars, a voltage is applied to the flat electrodes and active layer of the functional element is switched. The smaller area of the individually electrically controllable regions, the more complex and the smaller the parts involved in the electrical contacting will be.

EP 2416385 A1 relates to a multilayer back contact film and a method for connecting solar cells by means of these.

EP 1840449 A1 describes a lighting panel comprising a glass substrate, an electrically conductive coating, and a plurality of LEDs, wherein the LEDs are electrically contacted via conductor tracks in the electrically conductive coating and two bus bars are arranged at the same edge of the lighting panel.

WO 2020/083563 A1 and WO 2020/083562 A1 disclose composite panes with electrically controllable functional elements which can be switched in segments, with a first group of bus bars which electrically contact the segments introduced into the first flat electrode, and at least one second bus bar which electrically contacts the second flat electrode.

The present invention addresses the problem of providing a switchable functional element with electrically controllable optical properties which has improved electrical control with stepped switchability.

The problem addressed by the present invention is solved by a functional element with electrically controllable optical properties according to independent claim 1. Preferred embodiments are apparent from the dependent claims.

The functional element according to the invention comprises an active layer between a first flat electrode and a second flat electrode. The active layer has controllable optical properties which can be controlled by the voltage applied to the flat electrodes. The flat electrodes are applied to carrier films. The flat electrodes, active layer and the carrier films are typically arranged essentially parallel to one another. The flat electrodes are electrically conductively connected to bus bars via which the functional element can be connected to an external voltage source. The active layer is arranged flat between the first flat electrode and the second flat electrode. The functional element comprises a plurality of side edges, wherein a first bus bar and a second bus bar are arranged on at least one first side edge. The first bus bar contacts the first flat electrode electrically conductively, while the second bus bar contacts the second flat electrode electrically conductively. The first carrier film comprises at least one first recess, within which the material of the first carrier film with the first flat electrode located thereon has been removed. The second bus bar is attached to the surface of the first carrier film facing away from active layer and the first flat electrode. The second bus bar passes through the first recess and electrically contacts the second flat electrode in this region. In this case, no active layer is present in the region of the first recess and the second bus bar is directly electrically contacted on the second flat electrode. The first bus bar runs on the surface of the second carrier film facing away from active layer and the second flat electrode. The second carrier film comprises at least one second recess within which the material of the second carrier film and the second flat electrode located thereon has been removed. The first bus bar engages through the second carrier film in the region of the second recess and electrically contacts the first flat electrode. In this case, no active layer is present in the region of the second recess and the first bus bar is directly electrically contacted in this region on the first flat electrode. At least one of the bus bars is divided into at least one first section and at least one second section. The first bus bar is thus divided into at least one first section and at least one second section, and/or the second bus bar is divided into at least one first section and at least one second section. The sections of the first bus bar are controllable independently of one another. The same applies to the sections of the second bus bar.

Adjacent sections of a bus bar are preferably separated from one another by separating lines, wherein the electrical conductivity of an insulator is present in the region of the separating lines and no electrical current flows between adjacent sections of the bus bar. In this way, regions of the functional element can be controlled in a targeted manner. The bus bars can first be attached along at least one side edge and then divided into at least two sections, so that a single application of the sections is not required.

The functional element according to the invention enables a simplified electrical contacting of the flat electrodes in the edge region. The bus bars are in each case applied to the surfaces of the carrier films facing away from the flat electrodes and pass through the closest carrier film locally in the region of the recesses in order to be electrically contacted on the flat electrode remote from the respective bus bar. In this way, first bus bars and second bus bars can be applied together on a first side edge. The number of side edges at which contacting must take place can thereby be reduced.

The division of one or both bus bars into sections which are electrically separated from one another allows active layer to be selectively switched in sections, wherein the selectively switchable regions of active layer lie within the regions of the flat electrodes in which a voltage is applied via the bus bars. For the targeted control of individual regions of the functional element, the opposite poles of a voltage source are connected to the respective sections of the bus bars of the first flat electrode and of the second flat electrode depending on the desired connection diagram of the active layer. A first pole of the voltage source is connected to sections of the second bus bars, while the opposite pole of the voltage source is connected to sections of the first bus bars, which are contacted in the region of the regions of the first flat electrode that are to be controlled. An electrical potential difference between the flat electrodes is therefore present only in the regions of the functional element in which the corresponding regions of the first flat electrode are connected to the voltage source. Accordingly, the active layer of the functional element is also switched only in these regions. The targeted control of the segments of the first flat electrode at which a voltage is to be applied is effected, for example, via an external control unit.

The first recesses and the second recesses are arranged alternatingly with respect to one another. At least one first recess and at least two second recesses or at least two first recesses and at least one second recess are thus present in order to ensure an alternating arrangement along the first side edge. Preferably, at least two first recesses and at least two second recesses are present, which are arranged alternatingly with one another along the first side edge. An alternating arrangement of the recesses enables a targeted control of all surface regions of the functional element, wherein their precision increases with an increasing number of first and second recesses.

The functional element has a plurality of side edges, particularly preferably four side edges. However, the functional element can also comprise more than four side edges. In each case, at least two side edges of the functional element lie opposite one another essentially in pairs. In one embodiment with four side edges, this results in two pairs of, in each case, two opposite side edges. The opposite side edges of a functional element can run parallel to one another or not be parallel to one another. The side edges do not have to be straight, but often have a curve. The length of opposite side edges can be different from one another. For example, the functional element can have a trapezoidal outline. In a preferred embodiment, the functional element has a plurality of side edges, for example four side edges.

In a preferred embodiment of the functional element, at least one further first bus bar and/or second bus bar is arranged at least on a second side edge. At least one further bus bar causes a more uniform voltage distribution, so that the switching operation of the functional element is improved. In the sense of a homogeneous voltage distribution, bus bars are in particular arranged on opposite side edges of the functional element. Particularly preferably, a first bus bar and a second bus bar are arranged on at least one second side edge, wherein the contacting of the bus bars with associated flat electrode is effected via first recesses and second recesses. The first and second recesses are attached here along the second side edge analogously to the described possible arrangements on the first side edge, wherein arrangement on the first side edge can differ from the arrangement on the second side edge within a functional element.

The invention makes it possible to attach a first bus bar and a second bus bar together to a side edge of the functional element. As a result, other side edges of the functional element can be kept free of bus bars if required. This is advantageous, for example, if the functional element does not extend over the entire surface of the glazing and an edge of the functional element lies in the visually transparent region of the glazing. In the sense of an attractive appearance, a second bus bar is dispensed with on this side edge.

The functional element preferably has a first bus bar and a second bus bar along the first side edge, the second side edge, the third side edge and the fourth side edge. In this way, a switching behavior that is as homogeneous as possible can be achieved in all regions of the functional element in the case of a simultaneous switching. On the other hand, in a stepped switching of the functional element, a very precise control of individual regions is possible.

In one possible embodiment, the first flat electrode and/or the second flat electrode comprise at least one separating line which divides the functional element into regions, also called segments, which can be switched independently of one another. The separating line can also be referred to as an isolation line and causes an electrical separation of the individual segments of the flat electrode from one another. Within the meaning of the invention, a separating line is to be understood as a linear region within a flat electrode which is not electrically conductive and which extends over the entire thickness of the flat electrode. A separating line between the individual segments of a flat electrode ensures that there is no current flow other than via the controlled segment of the coating. The width of the segments of a flat electrode is defined by the distance between one or more separating lines which delimit the segment in its width. The width of a segment is measured here along the direction in which the shortest associated section of the bus bar runs.

The at least one separating line preferably runs in a straight, wavy or meandering fashion between two opposite side edges of the functional element. However, other patterns with one or more separating lines are also conceivable.

The segments of the flat electrodes are preferably arranged essentially parallel to one another, wherein the segments extend continuously from one side edge of the functional element to an opposite side edge.

The number of segments within the flat electrodes can vary depending on the field of application of the glazing and is generally between 2 and 20, preferably between 3 and 10.

The electrical contacting of the bus bars with an external power source is realized by suitable connection cables, for example foil conductors. External control elements suitable for controlling the individual segments will be known to a person skilled in art.

The electrical control of the functional element is effected, for example, by means of switches or rotary or sliding controls which are integrated, for example, in the fittings of a vehicle. However, a button for control can also be integrated in the composite pane, for example a capacitive button. Alternatively, the functional element can also be controlled by contactless methods, for example by recognizing gestures, or as a function of the state of pupil or eyelid determined by a camera and suitable evaluation electronics.

The at least one separating line is introduced into the flat electrodes in such a way that the segments of the flat electrode are electrically isolated from one another. The individual segments are connected to the voltage source independently of one another via the individual sections of the bus bars, so that they can be controlled separately. Different regions of the functional element can thus be switched independently. Particularly preferably, the segments are arranged horizontally in the installation position. The height of the non-transparent region of the functional element can thus be controlled by the user. The term "horizontal" is to be interpreted broadly here and denotes a direction of propagation which runs between the side edges of the composite pane, for example the side edges of a windshield or a roof pane. The separating lines do not necessarily have to be straight, but can also be slightly curved, preferably adapted to a possible curvature of the closest pane edge, in particular essentially parallel to the front roof edge of a windshield. Vertical isolation lines are of course also conceivable.

The separating lines have, for example, a width of 5 μm to 500 μm, in particular 20 μm to 200 μm. The width of the segments, i.e., the distance between adjacent separating lines, can be suitably selected by the person skilled in art according to the requirements in individual cases.

The separating lines can be introduced by laser ablation, mechanical cutting, or etching during the production of the functional element. Already laminated multilayer films can also be segmented subsequently by means of laser ablation.

The conductor bars (bus bars) are, for example, connected to the flat electrodes as strips of an electrically conductive material or electrically conductive imprintments. The bus bars are preferably designed as electrically conductive imprintments comprising silver.

The functional element can optionally be designed as a PDLC element, as an SPD functional element, as an electrochromic or as an electroluminescent functional element, wherein the composition of active layer differs depending on the type of functional element. The functional elements mentioned and their structure will be known to a person skilled in art.

The functional element is preferably an electrochromic functional element and active layer is thus an electrochromic layer. The active layer of an electrochromic functional element is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, which causes a migration of the ions. Suitable functional layers contain, for example, at least tungsten oxide or vanadium oxide. Electrochromic functional elements are known, for example, from WO 2012007334 A1, US20120026573 A1, WO 2010147494 A1, and EP 1862849 A1.

In a further embodiment, the functional element is a PDLC (polymer-dispersed liquid crystal) functional element. The active layer of a PDLC functional element contains liquid crystals which are embedded in a polymer matrix. If no voltage is applied to the flat electrodes, the liquid crystals will be aligned in a unordered manner, which results in strong scattering of the light passing through active layer. If a voltage is applied to the flat electrodes, the liquid crystals will align in a common direction and the transmission of light through active layer is increased. Such a functional element is known, for example, from DE 102008026339 A1.

In a further preferred embodiment, the functional element is an SPD (suspended-particle device) functional element. The active layer contains suspended particles, wherein absorption of light through active layer can be changed by applying a voltage to the flat electrodes. The absorption change is based on alignment of the rod-like particles in the electrical field when the electrical voltage is applied. SPD functional elements are known, for example, from EP 0876608 B1 and WO 2011033313 A1.

In the case of an electroluminescent functional element, active layer contains electroluminescent materials, in particular organic electroluminescent materials, the luminescence of which is excited by application of a voltage. Electroluminescent functional elements are known, for example, from US2004227462 A1 and WO 2010112789 A2. The electroluminescent functional element can be used as a simple light source, or can be shown as a display with the desired representations.

The first bus bars and the second bus bars comprise an electrically conductive structure, preferably containing silver, and have a thickness of 5 μm to 40 μm.

The bus bars are intended to be connected to an external voltage source so that there is an electrical potential difference between the first flat electrode and the second flat electrode.

The bus bars can in particular be attached by being placed on, printed on, soldered, or glued.

In a preferred embodiment, the bus bars are designed as printed-on and baked-in conductive structures. The printed-on bus bars contain at least one metal, preferably silver. The electrical conductivity is preferably realized via metal particles, contained in the bus bar, particularly preferably via silver particles. The metal particles can be in an organic and/or inorganic matrix such as pastes or inks, and preferably as a baked screen-printing paste with glass frits. The layer thickness of the printed-on bus bar is preferably 5 μm to 40 μm, particularly preferably 8 μm to 20 μm, and very particular 10 μm to 15 μm. Printed-on bus bars with these thicknesses are technically simple to realize and have an advantageous current-carrying capacity.

Alternatively, the bus bars are designed as strips of an electrically conductive film. The bus bars then contain, for example, at least aluminum, copper, tin-plated copper, gold, silver, zinc, tungsten, and/or tin or alloys thereof. The strip preferably has a thickness of 10 μm to 500 μm, particularly preferably of 30 μm to 300 μm. Bus bars made of electrically conductive films with these thicknesses are technically simple to realize and have an advantageous current-carrying capacity. The strip can be electrically conductively connected to the flat electrode, for example via a soldering compound, via an electrically conductive adhesive or an electrically conductive adhesive tape, or by direct application. For improving the conductive connection, a silver-containing paste can be arranged between the flat electrode and the bus bar, for example.

The first flat electrode and the second flat electrode are each formed by an electrically conductive layer. These electrically conductive layers contain at least one metal, a metal alloy or a transparent conductive oxide, preferably a transparent conductive oxide, and have a thickness of 10 nm to 2 μm. The flat electrodes are preferably transparent. Here, "transparent" means permeable to electromagnetic radiation, preferably electromagnetic radiation of a wavelength from 300 nm to 1300 nm and in particular to visible light. Electrically conductive layers according to the invention are known, for example, from DE 20 2008 017 611 U1, EP 0 847 965 B1, or WO 2012/052315 A1. They typically contain one or more, for example, two, three, or four electrically conductive, functional individual layers. The functional individual layers preferably include at least one metal, for example, silver, gold, copper, nickel, and/or chromium, or a metal alloy. The functional individual layers particularly preferably contain at least 90 wt % of the metal, and in particular at least 99.9 wt % of the metal. The functional individual layers can consist of the metal or the metal alloy. The functional individual layers particularly preferably contain silver or a silver-containing alloy. Such functional individual layers have a particularly advantageous electrical conductivity with simultaneously high transmission within the visible spectral range. The thickness of a functional individual layer is preferably from 5 nm to 50 nm, particularly preferably from 8 nm to 25 nm. In this thickness range, an advantageously high transmission in the visible spectral range and a particularly advantageous electrical conductivity are achieved.

The flat electrodes can in principle be formed by any electrically conductive layer which can be electrically contacted.

The functional element is preferably provided as a multilayer film with two outer carrier films. In such a multilayer film, the flat electrodes and the active layer are arranged between the two carrier films. The term "outer carrier film" here means that the carrier films form the two surfaces of the multilayer film. The functional element can thereby be provided as a laminated film which can be advantageously processed. The functional element is advantageously protected from damage, in particular corrosion, by the carrier films. In the order indicated, the multilayer film contains at least one first carrier film, a first flat electrode, an active layer, a second flat electrode, and a second carrier film.

The first carrier film and/or the second carrier film preferably contain at least one polymer, preferably polyethylene terephthalate (PET), that does not completely melt in autoclaving process. Particularly preferably, the first and the second carrier film consist of a PET film. This is particularly advantageous with regard to the stability of the multilayer film. However, the carrier films can also contain, for example, ethylene vinyl acetate (EVA) and/or polyvinyl butyral (PVB), polypropylene, polycarbonate, polymethyl methacrylate, polyacrylate, polyvinyl chloride, polyacetate resin, casting resins, acrylates, fluorinated ethylene propylene, polyvinyl fluoride, and/or ethylene tetrafluoroethylene. The thickness of each carrier film is preferably from 0.1 mm to 1 mm, particularly preferably from 0.1 mm to 0.2 mm. The carrier films according to the invention are preferably transparent. The flat electrodes are preferably arranged on a surface of the carrier film, i.e., on exactly one of the two sides of the carrier film (i.e., on its front side or its rear side). The carrier films are oriented here in the layer stack of the multilayer film such that the flat electrodes are arranged adjacent to active layer.

In the context of the invention, electrically-controllable optical properties are understood to mean those properties that are continuously controllable, but equally also those that can be switched between two or more discrete states.

In addition to active layer and the flat electrodes, the functional element can, of course, have other layers known per se, for example, barrier layers, blocking layers, anti-reflection layers, protective layers, and/or smoothing layers.

Functional elements as multilayer films are commercially available. The functional element is typically cut to the desired shape and size from multilayer film of greater dimensions. This can be effected mechanically, for example with a knife. In an advantageous embodiment, the cutting takes place by means of a laser. It has been found that the side edge is more stable in this case than with mechanical cutting. In the case of mechanically cut side edges, there can be a risk of the material contracting, so to speak, which is visually noticeable and adversely affects aesthetics of the pane.

In an advantageous embodiment, the functional element has an edge seal. The edge seal covers the side edge of the functional element peripherally and prevents in particular the diffusion of chemical constituents of the thermoplastic intermediate layer, for example plasticizers, into the active layer. At least along the lower edge of the functional element visible in windshields when looking through them, and preferably along all side edges, the edge seal is formed by a transparent colorless adhesive or a transparent colorless adhesive tape. For example, acrylic- or silicone-based adhesive tapes can be used as edge sealing. The transparent colorless edge seal has advantage that the edge of the functional element does not appear disturbing when looking through. Such an edge seal is preferably also applied in the case of side edges that are not visible.

The invention furthermore relates to a composite pane at least comprising a functional element according to the invention, a thermoplastic intermediate layer, a first pane and a second pane, wherein the thermoplastic intermediate layer has a first thermoplastic composite film which is arranged between the functional element and the first pane, and a second thermoplastic composite film which is arranged between the functional element and the second pane. In this way, the functional element can be securely integrated in the composite pane via the thermoplastic intermediate layer.

In the installed state of the composite pane in a motor vehicle or in a building, the first pane and the second pane of the composite pane according to the invention represent the inner pane and the outer pane.

The functional element is incorporated via the intermediate layer between the first pane and the second pane of the composite pane. The intermediate layer comprises here a first thermoplastic composite film which connects the functional element to the first pane, and a second thermoplastic composite film which connects the functional element to the second pane. Typically, the intermediate layer is formed by at least the first and the second thermoplastic composite films, which are arranged flat on one another and are laminated together, wherein the functional element is inserted between the two layers. The regions of the composite films overlapping with the functional element then form the regions which connect the functional element to the panes. In other regions of the pane, where the thermoplastic composite films have direct contact with one another, they can fuse during lamination such that the two original layers may no longer be identifiable and instead a homogeneous intermediate layer is present.

A thermoplastic composite film can be formed, for example, by a single thermoplastic film. A thermoplastic composite film can also be formed from sections of different thermoplastic films, the side edges of which are attached to one another. In addition to a first thermoplastic composite film or a second thermoplastic composite film, further thermoplastic composite films can also be present. If necessary, these can also be used for embedding further films comprising functional layers, for example infrared-reflective layers or acoustically damping layers.

The thermoplastic composite films can also contain tinted or colored regions. Such films are obtainable, for example, by co-extrusion. Alternatively, an untinted film section and a tinted or colored film section can be combined to form a thermoplastic composite film. The tinted or colored region can be homogeneously colored or tinted, i.e., can have a location-independent transmission. However, the tinting or coloring can also be inhomogeneous, in particular a transmission profile can be realized.

In one possible embodiment, the composite pane is a windshield of a motor vehicle. The windscreen comprises an upper edge and a lower edge and two side edges extending between the upper edge and lower edge. Upper edge means the edge intended to point upward in the direction of the vehicle roof in the installed position. The upper edge is generally referred to as the roof edge or front roof edge. Lower edge means the edge intended to point downward in the direction of the engine hood of the vehicle in the installed position. The lower edge is generally referred to as the engine edge.

Windshields have a central field of view, with high demands being placed on its optical quality. The central field of view has to have a high light transmission (typically greater than 70%). The said central field of view is in particular that field of view which is referred to by a person skilled in art as field of view B, viewing area B or zone B. The field of view B and its technical requirements are defined in Regulation No. 43 of the Economic Commission for Europe of the United Nations (UN/ECE) (ECE-R43, "Uniform provisions concerning approval of safety glazing materials and their installation on vehicles"). There the field of view B is defined in Annex 18.

In one possible embodiment of the windshield, the functional element represents a sun shade and is arranged above the central field of view (field of view B). This means that the functional element is arranged in the region between the central field of view and the front roof edge of the windshield. The functional element does not have to cover the entire region, but is positioned entirely within this region and does not project into the central field of view. In other words, the functional element is at a smaller distance from the upper edge of the windshield than the central viewing area. The transmission of the central field of view is thus not impaired by the functional element, which is positioned at a similar location to a conventional mechanical sun shade in the folded-down state.

The intermediate layer in the central field of view of the windshield is clear and transparent. This ensures that the view through the central field of view is not limited, so that the pane can be used as a windshield. A transparent thermoplastic intermediate layer denotes a layer having a light transmission of at least 70%, preferably at least 80%, in the visible spectral range. The transparent intermediate layer is present at least in the field of view A, preferably also in the field of view B according to ECE-R43.

The windshield is preferably intended for a motor vehicle, particularly preferably for a passenger car.

In one possible embodiment, a region of the thermoplastic intermediate layer via which the functional element is connected to the outer pane or the inner pane is tinted or colored. The transmission of this region in the visible spectral range is thus reduced compared to a non-tinted or non-colored layer. The tinted/colored region of the thermoplastic intermediate layer thus lowers the transmission of the windshield in the region of the sun shade. In particular, aesthetic impression of the functional element is improved because the tinting leads to a more neutral appearance, which is more pleasant for the observer.

In a further preferred embodiment of the composite pane according to the invention, it is used as a roof pane of a motor vehicle. The roof pane comprises a front roof edge which is adjacent to the windshield of the vehicle, a rear roof edge which points in the direction of the rear window, and two side edges which run along the vehicle doors between the front roof edge and the rear roof edge. The functional element is designed as a large-area shading of the roof pane, wherein the functional element is arranged on an area of at least 80% of the entire visually transparent region of the roof pane, preferably at least 90%, for example 100%, of the entire visually transparent region.

The bus bars located at the edges of the composite pane used as a roof pane or windshield are laminated by the opaque cover imprintment usually used in the edge region of the pane. If the functional element is used as a sun shade in a windshield, the edge of the functional element bordering the visually transparent region of the windshield generally remains free of cover imprintment.

In a preferred embodiment, the functional element, more precisely the side edges of the functional element, is surrounded peripherally by a thermoplastic frame film. The frame film is of frame-like design with a recess into which the functional element is inserted. The thermoplastic frame film can be formed by a thermoplastic film into which the recess has been introduced by cutting. Alternatively, the thermoplastic frame film can also be composed of a plurality of film sections around the functional element. The intermediate layer is thus, in a preferred embodiment, formed from a total of at least three thermoplastic composite films arranged flat on top of each other, wherein the frame film as middle layer has a recess in which the functional element is arranged. During production, the thermoplastic frame film is arranged between the first and the second thermoplastic composite films, wherein the side edges of all thermoplastic films are preferably congruent. The thermoplastic frame film preferably has roughly the same thickness as the functional element. This compensates for the local thickness difference of the composite pane which is introduced by the locally delimited functional element, so that glass breakage during lamination can be avoided. If the functional element is introduced into the composite pane over a large area, a frame film can be dispensed with.

The side edges of the functional element visible when looking through the composite pane are preferably arranged flush with the thermoplastic frame film, so that no gap exists between the side edge of the functional element and associated side edge of the thermoplastic frame film. This applies in particular to the lower edge of a functional element as a sun shade of a windshield in which this edge is typically visible. The boundary between the thermoplastic frame film and the functional element is thus visually less noticeable.

Automotive glazings, in particular windshields, rear windows, and roof panes, usually have a peripheral cover imprintment made of an opaque enamel, which in particular serves to protect and optically cover adhesive used for installing the pane from UV radiation. This peripheral cover imprintment is preferably used to cover also the edges of the functional element that are located in the edge region of the glazing. The bus bars and the required electrical connections are also attached in the region of the cover imprintment. In this way, the functional element is advantageously integrated into appearance of the composite pane. Preferably, at least the pane used as an outer pane has such a cover imprintment, particularly preferably both the first pane and the second pane (inner pane and outer pane) are printed, so that a through-view from either side is prevented.

The functional element can also have recesses or holes, for example in the region of so-called sensor windows or camera windows. These regions are intended to be equipped with sensors or cameras, the function of which would be impaired by a controllable functional element in the beam path, for example rain sensors.

The functional element is preferably arranged over the entire width of the composite pane, minus a double-sided edge region having a width of, for example, 2 mm to 20 mm. The functional element also preferably is at a distance of, for example, 2 mm to 20 mm from the upper edge. The functional element is thus encapsulated within the intermediate layer and protected from contact with the surrounding atmosphere and from corrosion.

The first thermoplastic composite film and the second thermoplastic composite film and optionally also the thermoplastic frame film preferably contain at least polyvinyl butyral (PVB), ethylene vinyl acetate (EVA) and/or polyurethane (PU), particularly preferably PVB.

The thickness of each thermoplastic composite film and of the frame film is preferably from 0.2 mm to 2 mm, particularly preferably from 0.3 mm to 1 mm, in particular from 0.3 mm to 0.5 mm, for example 0.38 mm.

The first pane and the second pane are preferably made of glass, particularly preferably of soda-lime glass, as is customary for window panes. However, the panes may also be manufactured from other types of glass, e.g., quartz glass, borosilicate glass, or aluminosilicate glass, or from rigid, clear plastics, e.g., polycarbonate or polymethyl methacrylate. The panes may be clear, or also tinted or colored. If the composite pane is used as a windshield, it should have sufficient light transmission in the central viewing area-preferably at least 70% in the main visually transparent region A according to ECE-R43.

The first pane, the second pane, and/or the intermediate layer can have further, suitable coatings known per se, e.g., anti-reflective coatings, non-stick coatings, anti-scratch coatings, photocatalytic coatings or sun protection coatings, or low-e coatings.

The thickness of the first pane and of the second pane can vary widely, and thus be adapted to the requirements in the individual case. The first pane and the second pane preferably have thicknesses of 0.5 mm to 5 mm, particularly preferably of 1 mm to 3 mm.

The invention also comprises a method for switching a functional element according to the invention, wherein a first electrical voltage $U_1$ is applied at least between a first section of the first bus bar and a first section of the second bus bar. The first electrical voltage $U_1$ corresponds to the switching voltage of the functional element, i.e., the voltage at which the functional element fully transitions into active state. A full transition into active state can be seen from the fact that, with a further increase in the applied voltage, no further change in the optical properties of the functional element takes place. A second electrical voltage $U_2$ is applied between a second section of the first bus bar and a second section of the second bus bar, absolute value of which is lower than absolute value of the voltage $U_1$. No full transition into active state thus takes place in a second region of the functional element which is associated with the second section of the first bus bar and the second section of the second bus bar. By contrast, a full transition into active state takes place in the first region of the functional element which is associated with the first section of the first bus bar and the first section of the second bus bar. The first region in active state thus adjoins the second region in the partially activated state, so that a visually appealing profile of the optically controllable properties of the functional element is produced.

A third region of the functional element which is contacted by a third section of the first bus bar and a third section of the second bus bar is preferably adjacent to the second region of the functional element which is associated with the second section of the first bus bar and the second section of the second bus bar. If no voltage is applied to this third region, the second region in the partially activated state forms a visually appealing transition between the fully activated first region and the inactive third region.

In a preferred embodiment of the method, the second electrical voltage $U_2$ is increased, after a variably definable period of time, to the absolute value of the first electrical voltage $U_1$, whereby the second region is also fully activated. A third voltage $U_3$ is particularly preferably applied thereafter or simultaneously between a third section of the first bus bar and a third section of the second bus bar, absolute value of said third voltage being lower than absolute value of the voltage $U_1$. In a third region of the functional element, in which the voltage $U_3$ is applied, a partial switching process of the functional element thus also takes place. For the observer of the functional element, the switching process appears as a wavelike propagation of active region of the functional element.

Particularly preferably, the method according to the invention for switching the functional element according to the invention comprises the following steps:

a) between an n-th section of the first bus bar and an n-th section of the second bus bar, a first electrical voltage $U_1$ is applied which corresponds to the switching voltage of the functional element, b) a second electrical voltage $U_2$ is applied between an (n+1)-th section of the first bus bar and an (n+1)-th section of the second bus bar, c) the electrical voltage between the (n+1)-th section of the first bus bar and the (n+1)-th section of the second bus bar is increased to absolute value of the first electrical voltage $U_1$, d) a second electrical voltage $U_2$ is applied between an (n+2)-th section of the first bus bar and an (n+2)-th section of the second bus bar, e) the steps c) and d) are repeated until a first electrical voltage $U_1$ is applied between all sections of the first bus bar and associated sections of the second bus bar.

The n-th section and the (n+1)-th section of a bus bar can be adjacent to one another or not. If the functional element comprises more than one first bus bar and/or more than one second bus bar, the n-th section and the (n+1)-th section of a bus bar can also lie on different side edges of the functional element. In this way, depending on arrangement of the sections and sequence in which they are controlled, a gradual switching of the functional element can take place, wherein a gradient can optionally be held or the functional element can be transferred in steps from an inactive to an active state.

In particular, the second electrical voltage $U_2$ is between 10% and 80% of the first electrical voltage $U_1$, preferably between 20% and 50% of the first electrical voltage $U_1$. Within these regions, a partial switching of the active layer is particularly favored. The change in the optical properties is, on the one hand, clearly visible and clearly distinguishable from the inactive region of the functional element and, on the other hand, is substantially weaker than in the fully activated region of the functional element.

The application of a voltage in regions of the functional element and a corresponding monitoring of the voltage profiles can be effected by means of control units known to a person skilled in art. Excessive charging or discharging of the functional element should be prevented here in order to prevent damage to active layer in the long term. In order to prevent this, the voltage is preferably not applied constantly, but the status of each region is monitored by measuring the open-circuit voltage between the bus bar sections of the corresponding region. The open-circuit voltage should be kept approximately constant here.

Figure 2A:
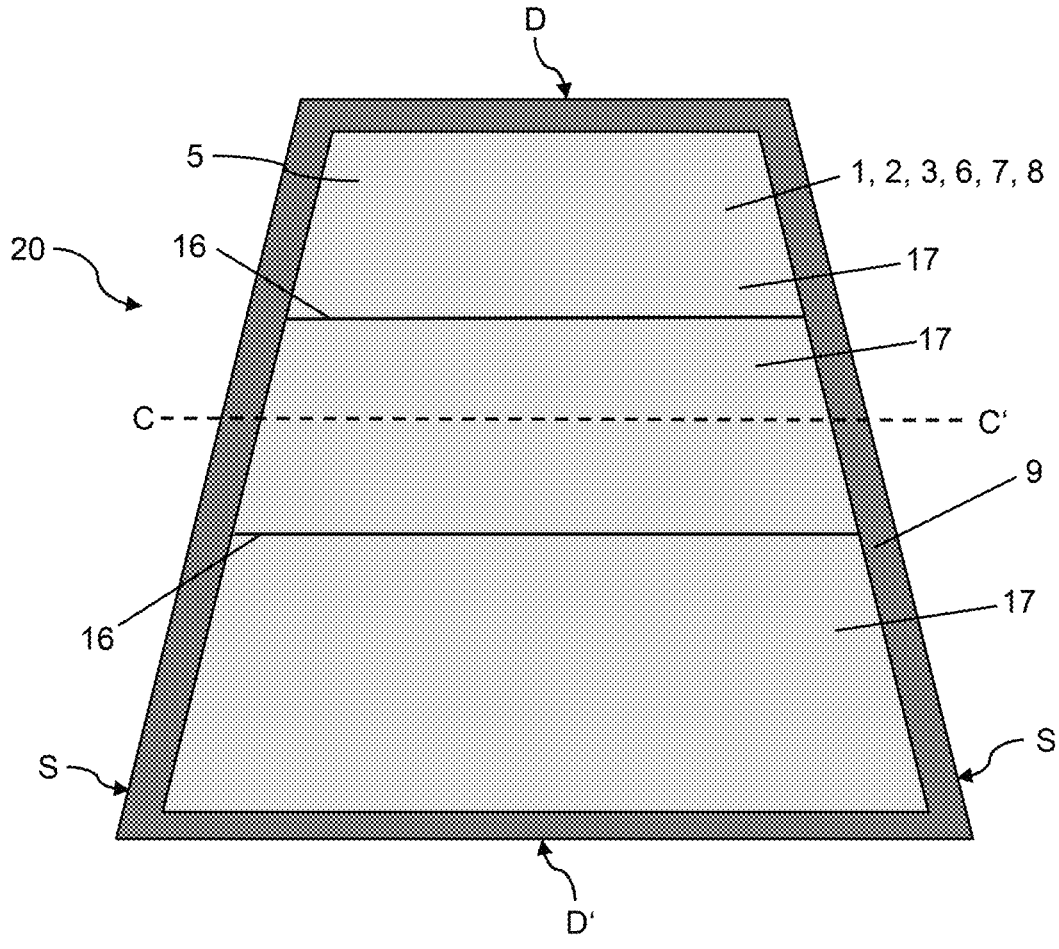
Figure 2B:
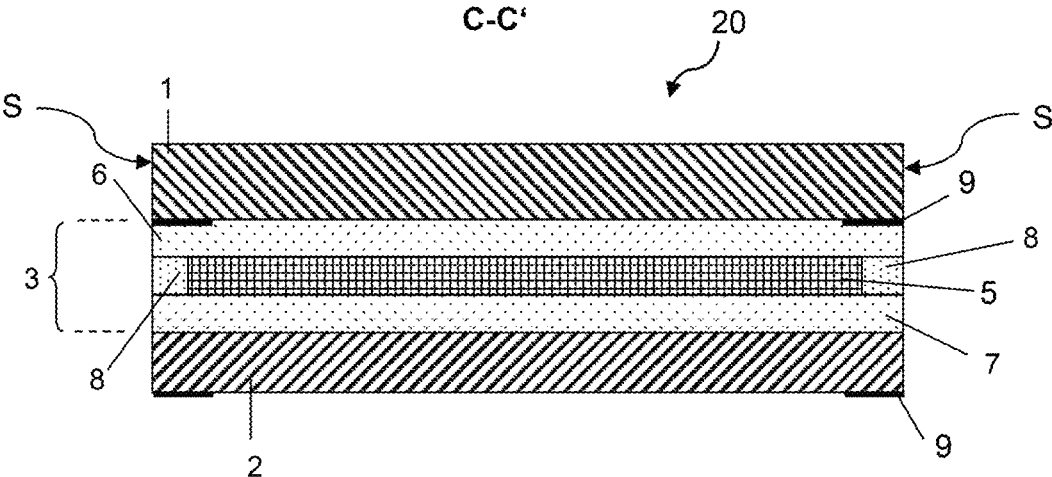
Figure 3A:
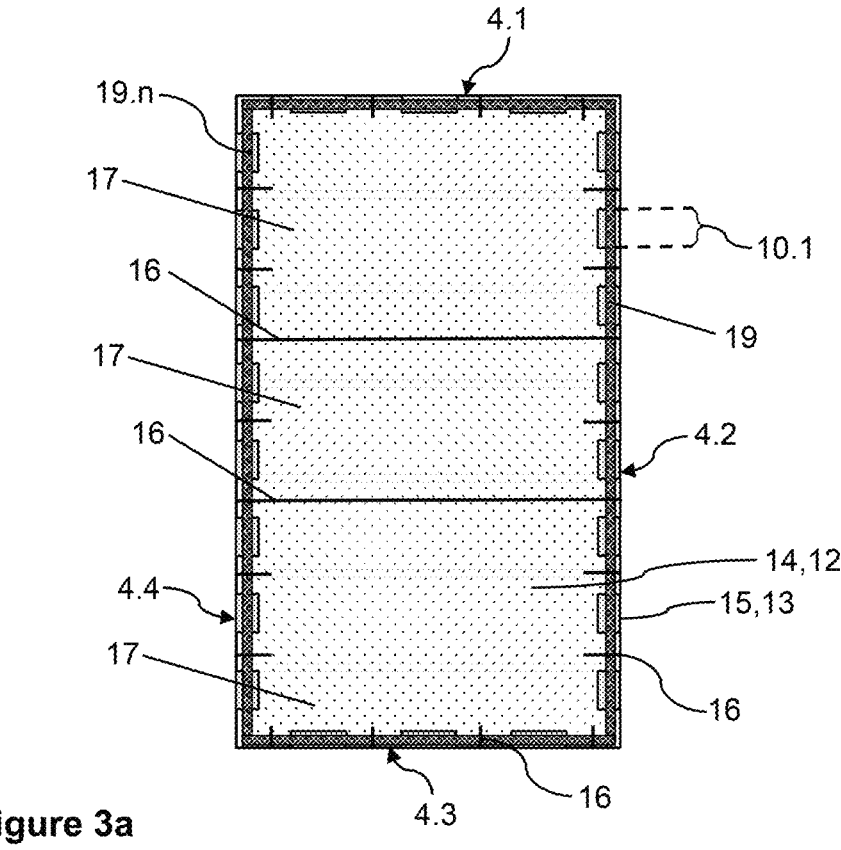
Figure 3B:
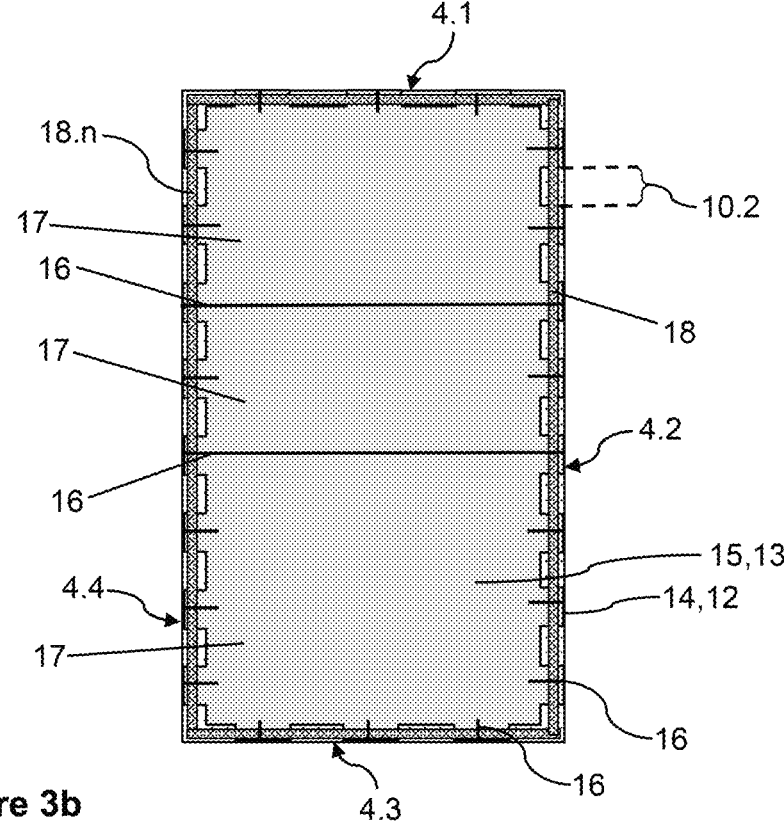

The invention is explained in more detail with reference to drawings and exemplary embodiments. The drawings are schematic representations and are not true to scale. The drawings do not limit the invention in any way. Shown are:

FIGS. 1a-e different views of a functional element according to the invention,

FIGS. 2a-2b a composite pane comprising a functional element according to the invention, FIGS. 3a-3b the functional element according to the invention of the composite pane according to FIGS. 2a-2b, and FIGS. 4a-4c schematic representations of the switching processes of a composite pane according to the invention.

Figure 1B:
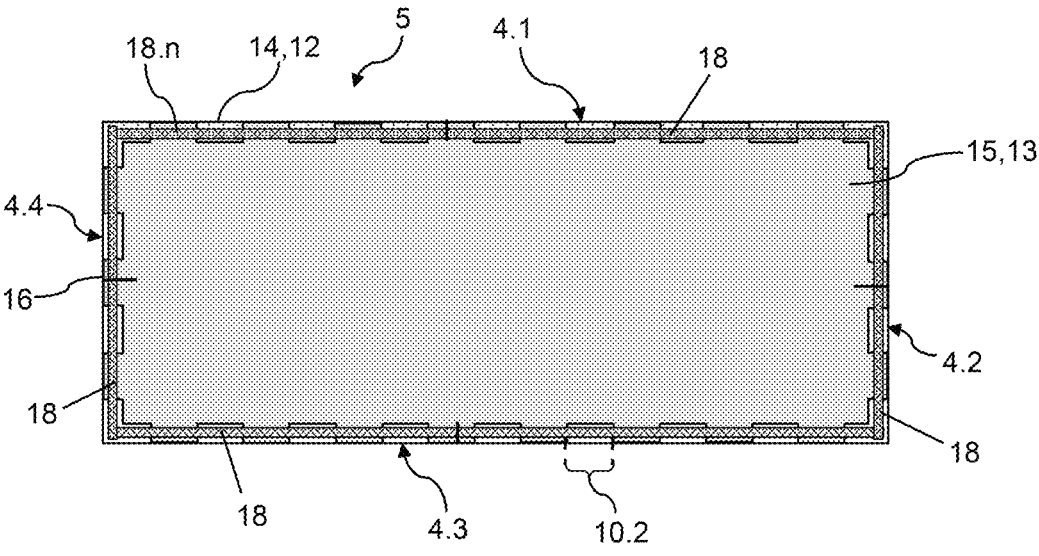
Figure 1C:
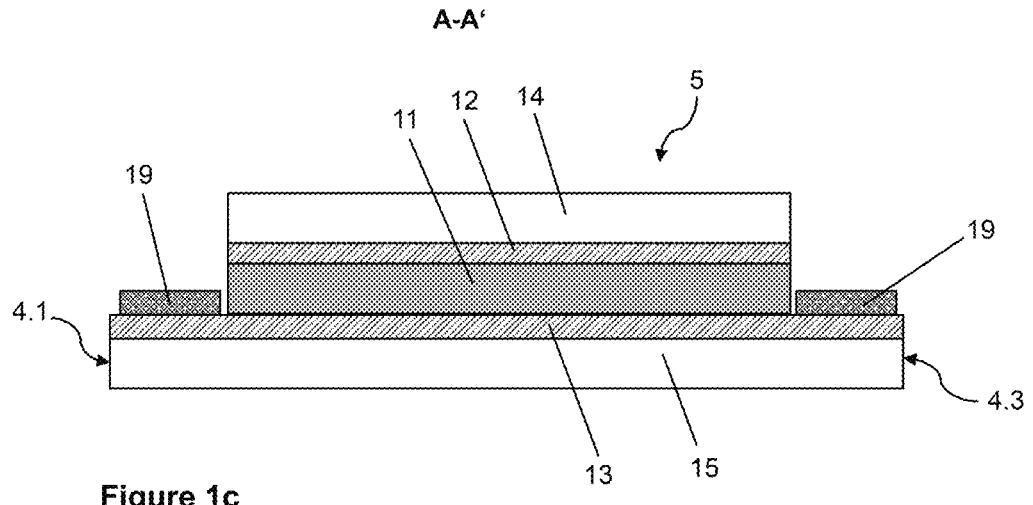
Figure 1D:
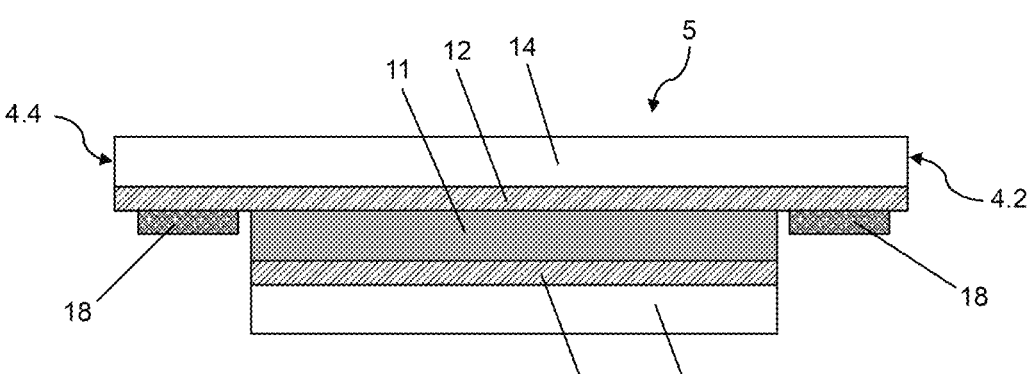
Figure 1E:
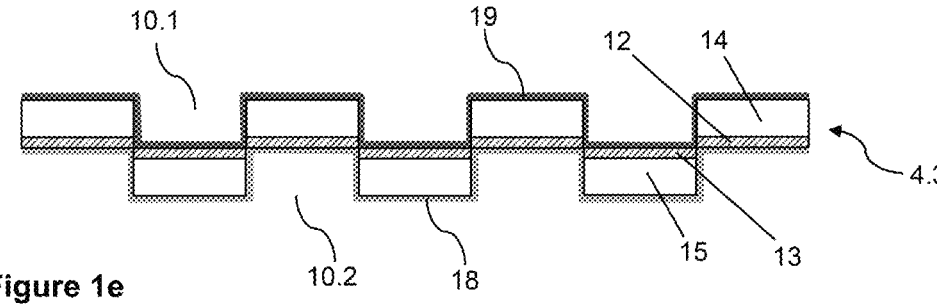

FIGS. 1a to 1e show a functional element 5 according to the invention comprising four side edges 4.1, 4.2, 4.3, 4.4. The functional element 5 is a multilayer film having electrically optical properties consisting of an active layer 11 between two flat electrodes 12, 13 and two carrier films 14, 15. The active layer 11 is an electrochromic layer which changes its color as a function of the electrical voltage applied to the flat electrodes, whereby the optical properties can be controlled. The carrier films 14, 15 are made of PET and have a thickness of, for example, 0.125 mm. The carrier films 14, 15 are provided with a coating, facing active layer 11, made of ITO with a thickness of about 100 nm, which form the first flat electrode 12 and the second flat electrode 13. The flat electrodes 12, 13 can be connected to the onboard electrical system via bus bars 18, 19 and connecting cables, not shown. The bus bars 18, 19 are divided by means of separating lines 16 into sections 18.$n$, 19.$n$ which can be controlled individually via connection cables. FIG. 1a shows a plan view of the first carrier film 14 of the functional element 5. First recesses 10.1 are introduced into the first carrier film 14 along the side edges 4.1, 4.2, 4.3, and 4.4 of the functional element 5, wherein the first carrier film 14 and the first flat electrode 12 located thereon are removed in the region of the first recesses 10.1. The active layer 11 is also removed in this region, so that the second flat electrode 13 is exposed. A second bus bar 19 is attached peripherally along the side edges 4.1, 4.2, 4.3, 4.4 on the surface of the first carrier film 14 facing away from the first flat electrode 12, said second bus bar extending in the region of the first recesses 10.1 through the latter and contacting the second flat electrode 13 electrically conductively. FIG. 1b shows a plan view of the second carrier film 15 of the functional element 5 according to FIG. 1a. The second carrier film 15 has, peripherally along the side edges 4.1, 4.2, 4.3, 4.4, second recesses 10.2 which are attached alternatingly to the first recesses 10.1 of the first carrier film 14. A first bus bar 18 is attached peripherally along the side edges 4.1, 4.2, 4.3, 4.4 on the surface of the second carrier film 15 facing away from the second flat electrode 13, said first bus bar extending in the region of the second recesses 10.2 through the latter and contacting the first flat electrode 12 electrically conductively. FIG. 1c shows a cross-section of the functional film 5 along the cutting line AA' according to FIG. 1a, whereas in FIG. 1d a cross-section along the cutting line BB' in FIG. 1a is shown. FIG. 1e shows a view of the functional film 5 in plan view of the side edge 4.3. The functional element 5 is provided peripherally with a first bus bar 18 and a second bus bar 19, whereby a particularly uniform switching process of the functional element 5 can be generated.

FIGS. 2a and 2b show an embodiment of a composite pane 20 according to the invention as a roof pane, wherein a plan view is shown in FIG. 2a and FIG. 2b shows a cross-section along the cutting line CC' in FIG. 2a. The roof pane comprises a first pane 1, which serves as an outer pane, and a second pane 2 as an inner pane. In this case, the inner pane is the pane directed towards the vehicle interior, while the outer pane points towards the vehicle environment. The first pane 1 and the second pane 2 are connected to one another via an intermediate layer 3. The first pane 1 is made of clear soda-lime glass and has a thickness of 2.1 mm. The second pane 2 is made of soda-lime glass with a thickness of 1.6 mm and is tinted gray. The tinted inner glass contributes to attractive appearance of the pane, also for the vehicle occupant when looking through the roof panel. The composite pane as a roof pane has a front roof edge D facing the windshield in the installed position and a rear roof panel D' facing the rear window in the installed position.

The roof pane is equipped with a functional element 5 as a large-area shade, wherein the functional element 5 is an electrochromic functional element which is embedded in the intermediate layer 3. The intermediate layer 3 comprises a total of three thermoplastic composite films 6, 7, 8 which are each formed by a thermoplastic film made of PVB having a thickness of 0.38 mm. The first thermoplastic composite film 6 is connected to the first pane 1; the second thermoplastic composite film 7 is connected to the second pane 2. The thermoplastic frame film 8 located in between has a cutout in which the functional element 5 is inserted precisely, i.e., flush, on all sides. The third thermoplastic layer thus forms as it were a kind of frame for the functional element 5, which is thus encapsulated by the thermoplastic material and protected thereby. The thermoplastic composite films 6, 7, 8 optionally have a tinting, wherein one or more of the films can be fully or partially tinted. Depending on the thickness of the functional element 5 and the resulting thickness difference relative to the region without functional element 5, the frame film 8 can be dispensed with. This is additionally dependent on the complexity of the pane curvature of the composite pane. In general, it can be determined that in the case of small thickness differences between regions with functional element and regions without functional element, and with low complexity of curvature, a frame film can be dispensed with.

Optionally, a further thermoplastic composite film (not shown) can be introduced adjacent to the outer pane (first pane 1). For example, carrier films with functional layers can be incorporated via the further thermoplastic composite film, for example a carrier film with an infrared reflective coating. The infrared reflective coating is oriented here in the direction of the first pane 1 (outer pane) and serves to reduce the heating of the passenger interior by solar radiation.

The roof pane has a peripheral cover imprintment 9, which covers both adhesion of the composite pane to the vehicle body and the electrical contacting of the flat electrodes of the functional element 5. The peripheral cover imprintment 9 is formed by an opaque enamel on the interior-side surfaces (facing the interior of the vehicle in the installed position) of the first pane 1 and the second pane 2. The distance of the functional element 5 from the front roof edge D, from the rear roof edge D' and the side edges of the roof pane is shorter than the width of the cover imprintment 9, so that the side edges 4.1, 4.2, 4.3, 4.4 of the functional element 5 are covered by the cover imprintment 9. In this case, the electrical connections are also expediently applied in the region of the coverimprintment 9 and thus advantageously laminated.

For the thermoplastic composite films 6, 7 and the thermoplastic frame film 8, a so-called "high-flow PVB" can preferably be used, which has a stronger flow behavior compared to standard PVB films. The layers thus flow more strongly around the functional element 5, as a result of which a more homogeneous visual impression arises and the transition from functional element 5 to frame film 8 is less pronounced. The "high-flow PVB" can be used for all or only for one or more of the thermoplastic films 6, 7, 8 with direct contact with the functional element 5.

FIGS. 3a and 3b show the functional element 5 of the composite pane 20 according to FIGS. 2a and 2b before integration of the functional element 5 into the composite pane 20, wherein the electrical contacting of the functional element 5 with bus bars 18, 19 can also be seen. FIG. 3a shows a plan view of the functional element 5 on the first carrier film 14, while FIG. 3b shows a plan view of the second carrier film 15. The functional element 5 substantially corresponds to the one described in FIGS. 1a-1e. In contrast thereto, separating lines are introduced at least in the first flat electrode 12. Two of these separating lines 16 run continuously between the first side edge 4.1 and the fourth side edge 4.4, which are opposite one another and divide the first flat electrode 12 into regions 17 which are switchable independently of one another. The first flat electrode 12 has, for example, separating lines 16 having a width of, in each case, 200 μm, which are introduced by means of laser methods. The separating lines 16 electrically isolate the regions 17 from one another. The number of regions 17 can be freely selected depending on application or customer request. Preferably, the separating lines 16 are introduced for dividing the regions 17 into the first flat electrode 12, into the second flat electrode 14 and into active layer 11. The first bus bar 18 and the second bus bar 19 are divided by means of separating lines 16 into sections 18.n of the first bus bar 18 and sections 19.n of the second bus bar 19. In this case, to divide the second bus bar 19, the separating lines 16 are in each case introduced into this bus bar 19 between adjacent first recesses 10.1. Separating lines 16 are introduced into the first bus bar 18 between adjacent second recesses 10.2. An electrically independently controllable section 18.n, 19.n of a bus bar 18, 19 is thus located within each recess 10. Thus, in turn, individual partial regions can be controlled independently of one another even within the regions 17, wherein a sharp distinction results between the regions 17 and a flowing course is present within the regions between active and inactive regions of the functional element.

Figures 4A, 4B, 4C:
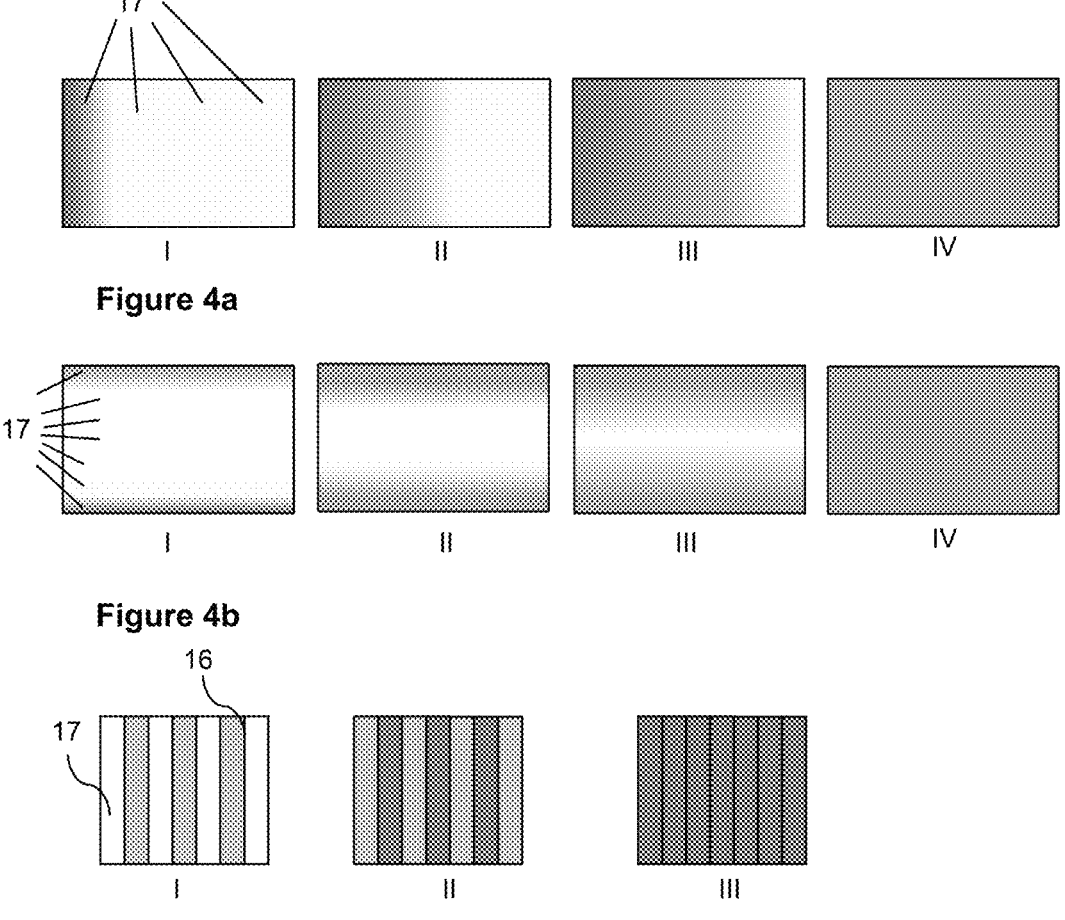

FIGS. 4a, 4b and 4c show exemplary schematic views of the switching processes in each case of a functional element 5, wherein regions 17 are successively shifted from the inactive into an active state by applying a voltage at the corresponding sections of the bus bars. FIGS. 4a and 4b here show a flowing profile of the electrically controllable optical properties between adjacent regions 17. According to FIG. 4c, separating lines 16 are applied between the regions 17, so that a sharp separation of the regions is visible.

LIST OF REFERENCE SIGNS

1 first pane
2 second pane
3 intermediate layer
4.1, 4.2, 4.3, 4.4 side edges of the functional element
5 functional element with electrically controllable optical properties
6 first thermoplastic composite film
7 second thermoplastic composite film
8 thermoplastic frame film
9 cover imprintment
10 recesses
10.1 first recesses
10.2 second recesses
11 active layer of the functional element 5
12 first flat electrode of the functional element 5
13 second flat electrode of the functional element 5
14 first carrier film
15 second carrier film
16 separating lines
17 regions
18 first bus bar
19 second bus bar
20 composite pane
D front roof edge of the composite pane
D' rear roof edge of the composite pane
S side edges of the composite pane
A-A', B-B', C-C' cutting line

The invention claimed is:

1. A functional element having electrically controllable optical properties with a plurality of side edges at least comprising a first carrier film having a first flat electrode and a second carrier film having a second flat electrode and an active layer arranged flat between the first flat electrode and the second flat electrode, wherein a first bus bar and a second bus bar are arranged on at least one first side edge, the first carrier film has at least one first recess and the second carrier film has at least one second recess, and wherein the first bus bar is arranged on a surface of the second carrier film facing away from the second flat electrode and in a region of at least one second recess passes through the latter and contacts the first flat electrode electrically conductively, the second bus bar is arranged on the surface of the first carrier film facing away from the first flat electrode and in a region of at least one first recess passes through the latter and contacts the second flat electrode electrically conductively, and the first bus bar is divided into at least one first section and at least one second section, which can be controlled independently of one another and/or the at least one second bus bar is divided into at least one first section and at least one second section, which can be controlled independently of one another, and the first recesses and the second recesses are arranged alternatingly with respect to one another.

2. The functional element according to claim 1, wherein at least one further first bus bar and/or second bus bar is arranged at least on a second side edge of the functional element.

3. The functional element according to claim 1, wherein a first bus bar and a second bus bar are each arranged on a first side edge, a second side edge, a third side edge and a fourth side edge of the plurality of side edges.

4. The functional element according to claim 1, wherein the first flat electrode and/or the second flat electrode comprise at least one separating line which divides the functional element into regions which can be switched independently of one another.

5. The functional element according to claim 1, wherein active layer is an electrochromic layer.

6. The functional element according to claim 1, wherein the first bus bars and the second bus bars comprise an electrically conductive structure and have a thickness of 5 $\mu m$ to 40 $\mu m$.

7. The functional element according to claim 6, wherein the electrically conductive structure contains silver.

8. The functional element according to claim 1, wherein the first flat electrode and the second flat electrode contain at least one metal, a metal alloy, or a transparent conductive oxide and have a thickness of 10 nm to 2 $\mu m$.

9. The functional element according to claim 8, wherein the first flat electrode and the second flat electrode contain a transparent conductive oxide.

10. A composite pane at least comprising a functional element according to claim 1, a thermoplastic intermediate layer, a first pane and a second pane, wherein the thermoplastic intermediate layer has a first thermoplastic composite film which is arranged between the functional element and the first pane, and a second thermoplastic composite film which is arranged between the functional element and the second pane.

11. A method for switching a functional element according to claim 1, comprising applying a first electrical voltage $U_1$, which corresponds to the switching voltage of the functional element, at least between a first section of the first bus bar and a first section of the second bus bar, and applying a second electrical voltage $U_2$, an absolute value of which is lower than absolute value of the voltage $U_1$, between a second section of the first bus bar and a second section of the second bus bar.

12. The method according to claim 11, wherein the second electrical voltage $U_2$ is increased to absolute value of the first electrical voltage $U_1$.

13. The method according to claim 12, wherein a third voltage $U_3$, absolute value of which is lower than absolute value of the voltage $U_1$, is applied between a third section of the first bus bar and a third section of the second bus bar.

14. The method according to claim 11, wherein
   a) between an n-th section of the first bus bar and an n-th section of the second bus bar, a first electrical voltage $U_1$ is applied which corresponds to the switching voltage of the functional element,
   b) a second electrical voltage $U_2$ is applied between an (n+1)-th section of the first bus bar and a (n+1)-th section of the second bus bar,
   c) the electrical voltage between the (n+1)-th section of the first bus bar and the (n+1)-th section f the second bus bar is increased to absolute value of the first electrical voltage $U_1$,
   d) a second electrical voltage $U_2$ is applied between an (n+2)-th section of the first bus bar and an (n+2)-th section of the second bus bar,
   e) the steps c) and d) are repeated until a first electrical voltage $U_1$ is applied between all sections of the first bus bar and associated sections of the second bus bar.

15. The method according to claim 11, wherein the second electrical voltage $U_2$ is between 10% and 80% of the first electrical voltage $U_1$.

16. The method according to claim 15, wherein the second electrical voltage $U_2$ is between 20% and 50% of the first electrical voltage $U_1$.

* * * * *